United States Patent [19]
Hoshi et al.

[11] Patent Number: 6,025,978
[45] Date of Patent: *Feb. 15, 2000

[54] COMPOSITE TYPE THIN-FILM MAGNETIC HEAD WITH IMPROVED RECORDING CHARACTERISTICS AND HIGH RESOLUTION

[75] Inventors: Satoru Hoshi; Kenji Komaki; Hirohiko Kamimura, all of Osaka-fu, Japan

[73] Assignee: Read-Rite Smi Corporation, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/994,330

[22] Filed: Dec. 19, 1997

[30]  Foreign Application Priority Data

Dec. 20, 1996  [JP]  Japan .................................. 8-355271

[51] Int. Cl.⁷ ........................................................ G11B 5/31
[52] U.S. Cl. ................................................................ 360/113
[58] Field of Search .................................. 360/119, 120, 360/125, 126, 113

[56]  References Cited

U.S. PATENT DOCUMENTS

| | | | |
|---|---|---|---|
| 4,589,042 | 5/1986 | Anderson et al. | 360/125 |
| 5,224,002 | 6/1993 | Nakashima et al. | 360/126 |
| 5,493,464 | 2/1996 | Koshikawa | 360/113 |
| 5,530,609 | 6/1996 | Koga et al. | 360/131 |
| 5,590,008 | 12/1996 | Tanabe et al. | 360/126 |
| 5,606,478 | 2/1997 | Chen et al. . | |
| 5,761,011 | 6/1998 | Miyauchi et al. | 360/133 |

FOREIGN PATENT DOCUMENTS

| | | |
|---|---|---|
| 55-058823 | 5/1980 | Japan . |
| 63-195817 | 8/1988 | Japan . |
| 4-157607 | 5/1992 | Japan . |
| 4-297004 | 10/1992 | Japan . |
| 6-195637 | 7/1994 | Japan . |

*Primary Examiner*—William J. Klimowicz
*Attorney, Agent, or Firm*—Blakely Sokoloff; Taylor & Zafman, LLP

[57]  ABSTRACT

A composite type thin-film magnetic head. In one embodiment, a substrate is used as a base, and an insulating film, a lower shielding magnetic film, a magneto-resistive element, an upper shielding magnetic film, a magnetic gap film, a recording inductive magnetic film and a protective layer are laminated on this base. An inductive head used for recording is formed by the upper shielding magnetic film. A magnetic gap film, a recording inductive magnetic film, and a magneto-resistive head used for playback are formed by the magneto-resistive element. The upper shielding magnetic film and recording inductive magnetic film are formed by an electroplating of permalloy. The upper shielding magnetic film has a lower nickel concentration on the side of the magnetic gap film than on the side of the magneto-resistive element.

2 Claims, 7 Drawing Sheets

Keys: a. Nickel Concentration, b. High, c. Low, d. Small, e. Large, f. Large, g. Small, h. Low, i. High, j. Large, k. Small, l. Small, m. Large

Keys: a. Nickel Concentration, b. High, c. Low, d. Small, e. Large, f. Large, g. Small, h. Low, i. High, j. Large, k. Small, l. Small, m. Large Keys: a. Nickel Concentration, b. High, c. Low, d. Small, e. Large, f. Large, g. Small, h. Low, i. High, j. Large, k. Small, l. Small, m. Large Keys: a. Nickel Concentration, b. High, c. Low, d. Small, e. Large, f. Large, g. Small, h. Low, i. High, j. Large, k. Small, l. Small, m. Large Keys: a. Nickel Concentration, b. High, c. Low, d. Small, e. Large, f. Large, g. Small, h. Low, i. High, j. Large, k. Small, l. Small, m. Large

COMPOSITE TYPE THIN-FILM MAGNETIC HEAD WITH IMPROVED RECORDING CHARACTERISTICS AND HIGH RESOLUTION

BACKGROUND OF THE INVENTION

1. Field of the Invention

The present invention relates generally to a thin-film magnetic head and, more specifically, the present invention relates to an MR-inductive composite type thin-film magnetic head that is integrally equipped with an inductive head used for recording and a magneto-resistive head (MR head) used for playback.

2. Background Information

Devices such as computers and word processors, etc., are now widely used in Japanese industry, and the magnetic memories contained in such devices have continued to increase in capacity. Furthermore, as the capacity of such magnetic memories has increased, there has been a need to improve the recording and playback performance of thin-film magnetic heads.

Under such conditions, composite type thin-film magnetic heads which are integrally equipped with an inductive head used for recording and a magneto-resistive head (MR head) used for playback have been proposed for use in place of conventional inductive heads.

The layer composition of a composite type thin-film magnetic head 1 is as shown in FIGS. 1, 2 and 3. That is, in such a head, an inductive head used for recording and a magneto-resistive head used for playback are laminated into an integral unit.

Specifically, in such a composite type thin-film magnetic head, an inductive head used for recording is formed by the upper portion shown as the portion indicated by bracket A in FIG. 3. Furthermore, a magneto-resistive element 5 is contained in the lower layers, so that a magneto-resistive head B is formed by this portion.

The respective layers will be described below.

The above-mentioned composite type thin-film magnetic head 1 uses a substrate 6 consisting of a ceramic such as $Al_2O_3$, etc., as a base, and an insulating film 7 consisting of $Al_2O_3$ is formed on the surface of this substrate 6. Furthermore, a lower shielding magnetic film 8 is laminated on the surface of this insulating film 7. Moreover, a magneto-resistive element 5 is embedded in this lower shielding magnetic film 8.

The magneto-resistive element 5 is a member which has a type of current-magnetic effect, and shows a change in electrical resistance as a result of the magnetization of the material. Materials which show a magneto-resistive effect include NiFe, NiFeCo, NiCo, FeMn, $Fe_3O_4$, CoPt/Cr and Fe/Cr, etc. The appropriate material of the magneto-resistive element 5 is selected from this set of materials.

An upper shielding magnetic film 10 is formed on top of the magneto-resistive element 5. This upper shielding magnetic film 10 is laminated over more or less the entire area of the substrate 6.

A magnetic gap film 11 is present on top of the upper shielding magnetic film 10, and a recording inductive magnetic film 12 is laminated so that this magnetic gap film 11 is sandwiched between said recording inductive magnetic film 12 and the upper shielding magnetic film 10. Furthermore, a protective layer 18 is formed on top of the recording inductive magnetic film 12.

The shapes of the magnetic gap film 11 and recording inductive magnetic film 12 as seen in a plan view are shown in FIG. 1. The front-end portions (where the magnetic gap is formed) are narrow, and the area is somewhat larger on the inside. Furthermore, as is shown in FIGS. 1 and 2, the recording inductive magnetic film 12 is separated from the upper shielding magnetic film 10 and magnetic gap film 11 on the inside of the composite thin-film magnetic head 1, and an insulating film 14, conductive coil film 15 and insulating film 16 are interposed between the upper shielding magnetic film 10 and recording inductive magnetic film 12. Furthermore, the upper shielding magnetic film 10 and recording inductive magnetic film 12 are coupled in the area of a rear gap 20 located to the rear, and the conductive coil film 15 is installed in the form of a coil centered on this rear gap 20.

Meanwhile, the upper shielding magnetic film 10 and the front-end portion of the recording inductive magnetic film 12 face each other across the magnetic gap film 11, so that a magnetic gap is formed in this area.

In the above-mentioned composite type thin-film magnetic head 1, the upper shielding magnetic film 10 functions as a magnetic shield which protects the magneto-resistive element 5 from the magnetic effects of the inductive head A used for recording which is laminated on top of said upper shielding magnetic film 10, and also functions as one of the cores of the inductive head.

Accordingly, in the upper shielding magnetic film of the prior art, a magnetic material which is the same as the material of the core of a conventional inductive head is used as the material of the upper shielding magnetic film.

In specific terms, in the above-mentioned conventional composite type thin-film magnetic head 1, magnetic films consisting of permalloy (Ni—Fe) are used as the upper shielding magnetic film 10 and recording inductive magnetic film 12. Furthermore, the above-mentioned upper shielding magnetic film 10 and recording inductive magnetic film 12 consisting of permalloy are formed by electroplating. Moreover, in the prior art, the concentrations (compositions) of these magnetic films are both fixed, and are uniform in all portions of the films.

Specifically, in the above-mentioned conventional composite type thin-film magnetic head 1, films formed by forming a nickel-iron alloy (permalloy) into a film are used as the magnetic films, and the compositions of the respective films are uniform in all portions of the films. Accordingly, in the conventional composite type thin-film magnetic head 1, the saturation flux density ($B_s$) and magnetic permeability ($\mu$) of the magnetic films are the same at all points in the films.

Furthermore, in regard to the composition of the permalloy magnetic films used in the conventional composite type thin-film magnetic head 1, a composition containing 81 to 83 wt % Ni has been considered optimal.

During recording, the composite type thin-film magnetic head 1 operates as follows. A signal current is applied to the conductive coil 15 so that a magnetic flux is generated in the magnetic gap between the tip end portions of the recording inductive magnetic film 12 and the upper shielding magnetic film 10. As a result, the signal is written on a magnetic medium 22.

During playback, the magnetic flux from the magnetic medium 22 passes through the area between the lower shielding magnetic film 8 and the upper shielding magnetic film 10 with the same timing as the passage of the magnetization transition regions. Accordingly, the resistance of the magneto-resistive element 5 located between the lower shielding magnetic film 8 and the upper shielding magnetic film 10 varies according to the variation in the magnetic flux in this case, so that a playback signal is output.

The above-mentioned composite type thin-film magnetic head 1 has a structure in which the head used for recording and the head used for playback are separate. Superior recording characteristics and a playback output with a higher resolution (compared to the characteristics of a conventional inductive head) are obtained by respectively optimizing the recording head and playback head.

However, the capacity of magnetic memories used in recent computers, etc., has been increasing at an accelerated rate. Accordingly, there is a need for composite type thin-film magnetic heads with even more superior recording characteristics and resolution.

Here, in the case of inductive heads, it is known that the recording characteristics of the head improve with an increase in the saturation flux density ($B_s$) of the magnetic films forming the core. Furthermore, in the case of permalloy, it is known that the saturation flux density ($B_s$) increases with a decrease in the nickel content. On the other hand, however, when the nickel content of permalloy is decreased, the magnetostriction constant increases so that the playback performance becomes unstable. Conventionally, therefore, permalloy containing 81 to 83 wt % Ni, which shows a good balance between saturation flux density ($B_s$) and magnetostriction constant, has been considered optimal for magnetic films used in heads.

On the other hand, in the case of the above-mentioned composite type thin-film magnetic head 1, the inductive head is used only for recording, with playback being accomplished by means of the above-mentioned magneto-resistive head. Accordingly, a drop in the playback performance of the inductive head which is secondarily generated as a result of an increase in the saturation flux density ($B_s$) of the magnetic films is not a problem.

However, in the above-mentioned composite type thin-film magnetic head 1, as was described above, one of the magnetic films must function both as a core and as a magnetic shield. Furthermore, for this magnetic film to exhibit a sufficient level of functioning as a magnetic shield, it is desirable that the saturation flux density ($B_s$) of said film be low. Accordingly, in the above-mentioned composite type thin-film magnetic head 1 as well, there is an upper limit to the saturation flux density ($B_s$) of the magnetic films, so that satisfactory recording characteristics cannot be obtained.

Therefore, it is desired to allow the use of films with a high saturation flux density ($B_s$) as the above-mentioned magnetic films, and to develop a composite type thin-film magnetic head which has both superior recording characteristics and high resolution.

SUMMARY OF THE INVENTION

A composite type thin-film magnetic head is described. In one embodiment, a substrate is used as a base. An insulating film, a lower shielding magnetic film, a magneto-resistive element, an upper shielding magnetic film, a magnetic gap film, a recording inductive magnetic film and a protective layer are laminated on the base. An inductive head used for recording is formed by the upper shielding magnetic film. A magnetic gap film, a recording inductive magnetic film, and a magneto-resistive head used for playback are formed by the magneto-resistive element. The upper shielding magnetic film and recording inductive magnetic film are formed by an electroplating of permalloy. The upper shielding magnetic film has a lower nickel concentration on the side of the magnetic gap film than on the side of the magneto-resistive element.

Explanation of Symbols

Figure 1:
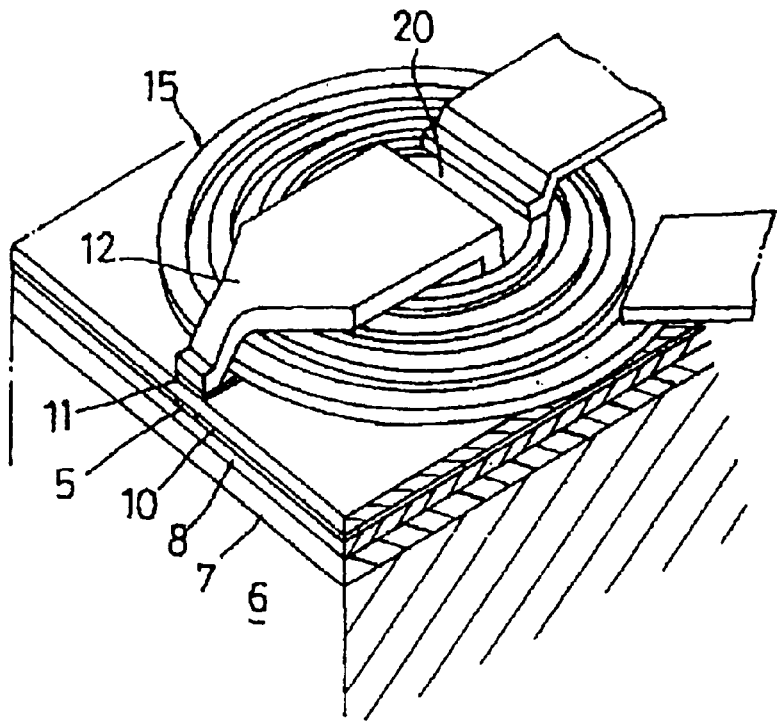
FIG. 1 is a perspective view which illustrates the internal structure of a common composite type thin-film magnetic head.

1 Composite type thin-film magnetic head
5 Magneto-resistive element
6 Substrate
7 Insulating film
8 Lower shielding magnetic film
10 Upper shielding magnetic film
11 Magnetic gap film
12 Recording inductive magnetic film
18 Protective layer.

DETAILED DESCRIPTION

One embodiment of the present invention includes a composite type thin-film magnetic head which is characterized by the fact that in a composite type thin-film magnetic head in which [i] an inductive head used for recording which has two magnetic film layers that face each other across a magnetic gap, and [ii] a magneto-resistive head used for playback which has a magneto-resistive element, are laminated, the magnetic film layer which is adjacent to the magneto-resistive element has a higher saturation flux density on the gap side than on the magneto-resistive element side.

In the composite type thin-film magnetic head of the present invention, the saturation flux density ($B_s$) of the magnetic film layer adjacent to the magneto-resistive element is made non-uniform, so that the saturation flux density ($B_s$) on the gap side of said magnetic film layer is higher than that of the magneto-resistive element side of said magnetic film layer. As a result, in the composite type thin-film magnetic head of the present invention, a strong magnetic flux is generated in the magnetic gap when a signal current is applied, so that signals can be accurately recorded on the magnetic medium 22.

Furthermore, in the above-mentioned magnetic film used in the present invention, the saturation flux density ($B_s$) in areas positioned on the opposite side from the gap is low. Accordingly, the performance of the film as a magnetic shield is high, and the magneto-resistive element is not greatly affected by magnetism from the inductive head used for recording.

A second embodiment of the present invention includes the composite type thin-film magnetic head of the above-mentioned embodiment and is characterized by the fact that [a] the magnetic film layer which is adjacent to the aforementioned magneto-resistive element consists of an alloy of nickel and iron, and [b] the nickel concentration on the gap side of said magnetic film layer decreases from the magneto-resistive element side toward the gap side.

An alloy containing nickel and iron is used as the above-mentioned magnetic film layer, and the nickel concentration in this magnetic film layer is decreased from the magneto-resistive element side of the magnetic film layer toward the gap side of said magnetic film layer. Here, in an alloy consisting of nickel and iron, the saturation flux density ($B_s$) is generally high in cases where the nickel content of the alloy is low. In the present invention, a magnetic film layer in which the nickel concentration decreases from the magneto-resistive element side of the magnetic film layer toward the gap side of the magnetic film layer is used as the above-mentioned magnetic film layer. Accordingly, this magnetic film layer has a higher saturation flux density ($B_s$) on the gap side than on the other side, so that signals can be accurately written on the magnetic medium 22.

In yet another embodiment, the present invention includes the composite type thin-film magnetic head of the above-mentioned embodiment and is characterized by the fact that the magnetic film layer which is adjacent to the aforementioned magneto-resistive element is formed by laminating two of more different types of metal layers.

Working configurations of the present invention will be described below.

The composite type thin-film magnetic head 1 constituting one working configuration of the present invention is exactly the same as a conventional composite type thin-film magnetic head in terms of external appearance.

Figure 2:
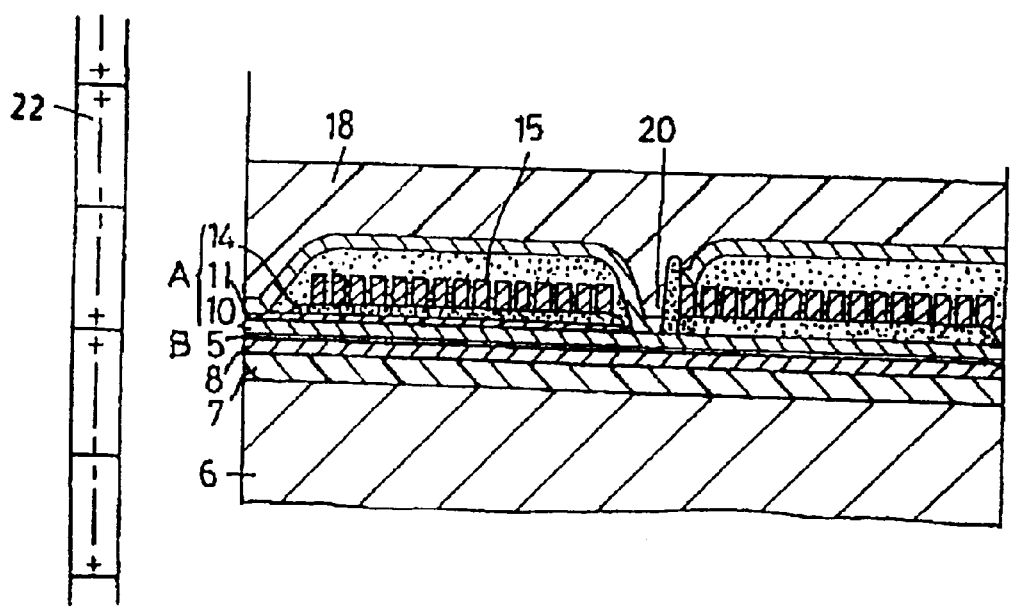
FIG. 2 is a sectional view of the same common composite type thin-film magnetic head.
Figure 3:
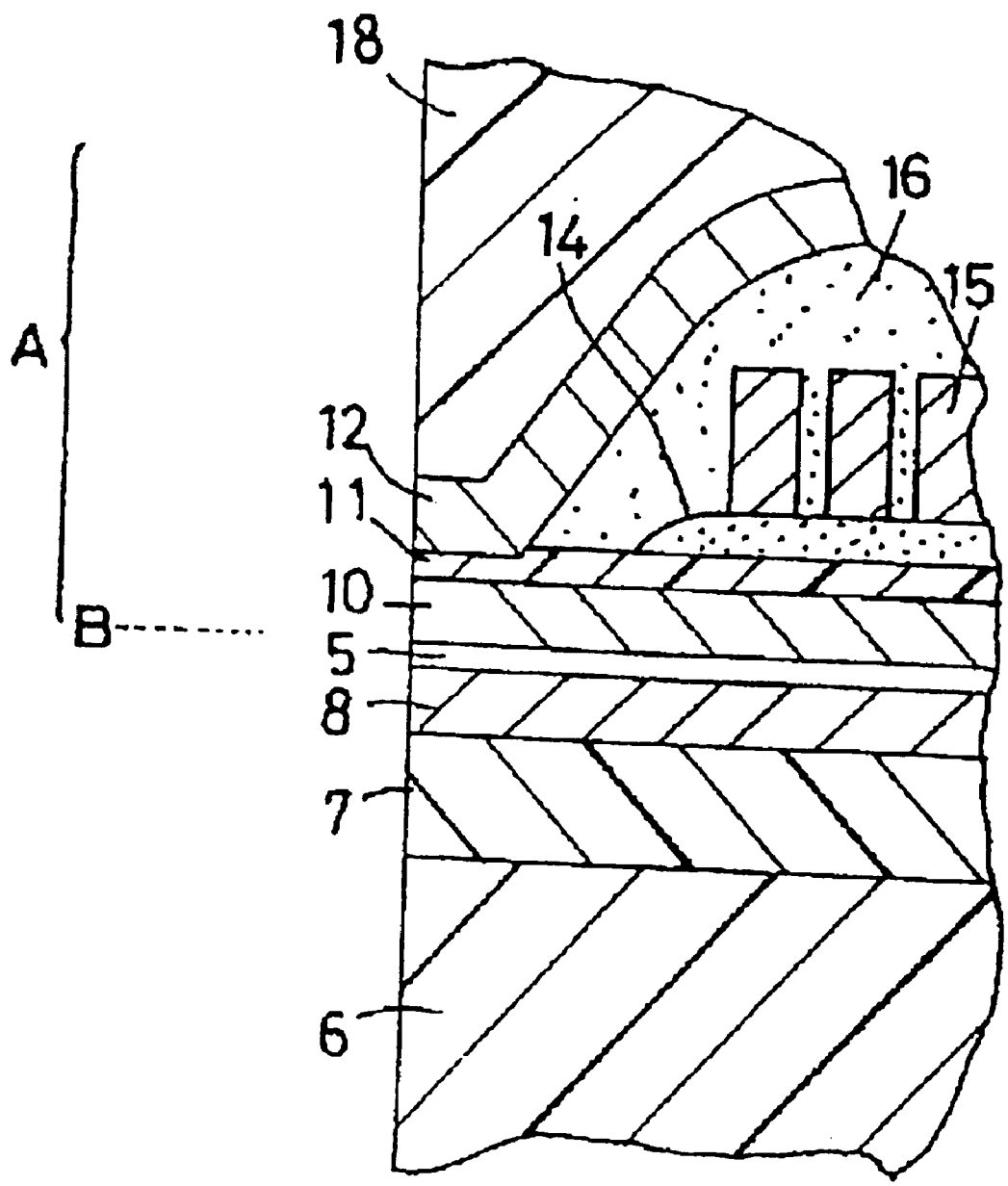
FIG. 3 is an enlarged section view of the gap portion of the composite type thin-film magnetic head shown in FIG. 2.

Specifically, the construction of the composite type thin-film magnetic head constituting one working configuration of the present invention is as shown in the aforementioned FIGS. 1 through 3. In this magnetic head, a substrate 6 consisting of a ceramic such as $Al_2O_3$-TiC, etc., is used as a base, and an insulating film 7, lower shielding magnetic film 8, magneto-resistive element 5, upper shielding magnetic film 10, magnetic gap film 11, recording inductive magnetic film 12 and protective layer 18 are laminated on this base. Furthermore, an insulating film 14, conductive coil film 15 and insulating film 16 are interposed between the upper shielding magnetic film 10 and recording inductive magnetic film 12.

Moreover, an inductive head used for recording is formed by the portion of the head consisting of the upper shielding magnetic film 10, magnetic gap film 11 and recording inductive magnetic film 12, etc., and a magneto-resistive head used for playback is formed by the portion of the head consisting of the magneto-resistive element 5.

The essential points of the composite thin-film magnetic head 1 of the present working configuration are the composition and physical properties of the upper shielding magnetic film 10 and recording inductive magnetic film 12.

These points will be described in detail below.

Figure 4:
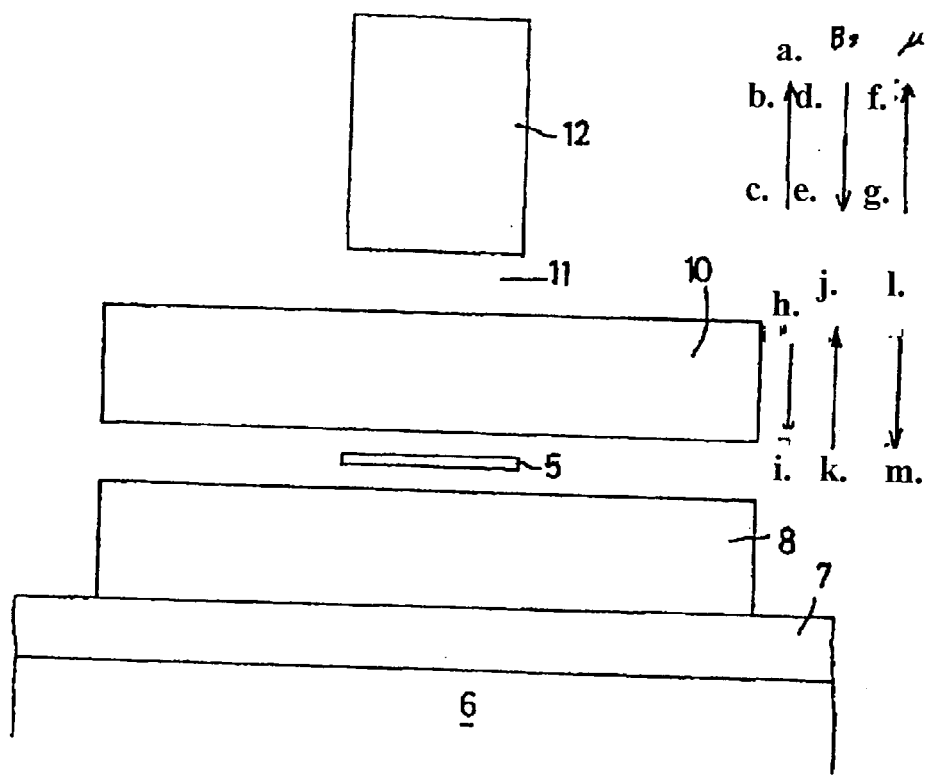
FIG. 4 is an explanatory diagram which shows the composite type thin-film magnetic head 1 of one working configuration of the present invention in model form, as viewed from the side of the head gap.
Figure 5:
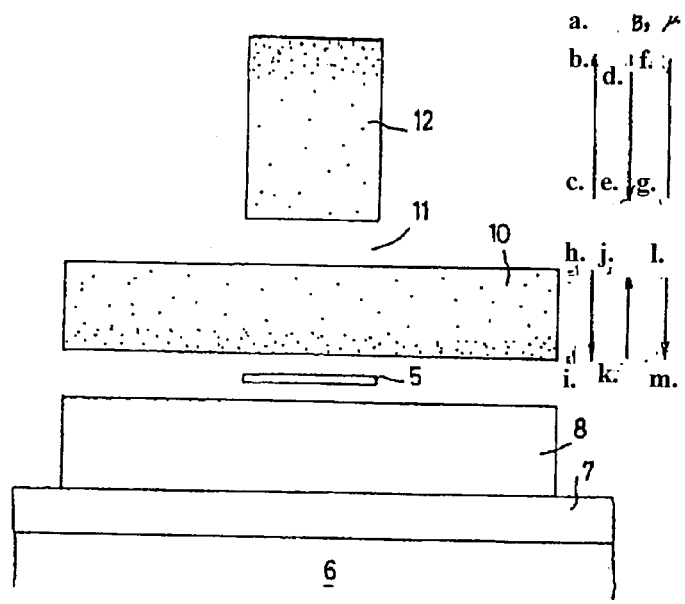
FIG. 5 is an explanatory diagram which shows the respective distributions of the nickel concentration, saturation flux density ($B_s$) and magnetic permeability ($\mu$) in the composite type thin-film magnetic head 1 of the above-mentioned working configuration.

The layer composition in the front-end portion of the composite type thin-film magnetic head 1 of the present working configuration is as shown in FIG. 4. A substrate 6, insulating film 7, lower shielding magnetic film 8, magneto-resistive element 5, upper shield magnetic film 10, magnetic gap film 11, insulating film 14, conductive coil film 15, insulating film 16, recording inductive magnetic film 12 and protective layer 18 are laminated in that order from the bottom side with respect to the figure. A magnetic gap is formed by the upper shielding magnetic film 10 and recording inductive magnetic film 12.

Furthermore, in the present working configuration, the material of the upper shielding film 10 and the recording inductive magnetic film 12 is a nickel-iron binary alloy (permalloy). However, the composition of this alloy is not uniform. Instead, the proportions of nickel and iron vary in the direction of thickness of the films (i. e., in the vertical direction in FIG. 4), so that the proportion of nickel decreases toward the gap side in each of the above-mentioned films.

Specifically, in the upper shielding magnetic film 10, the alloy composition is 83 wt % nickel in the portion of the film adjacent to the magneto-resistive element 5 (on the lower side in the figure), while the alloy composition is 75 wt % nickel in the portion of the film adjacent to magnetic gap film 11. In an even more preferable composition of the upper shielding magnetic film 10, the alloy composition is 83 wt % nickel in the portion of the film adjacent to the magneto-resistive element 5 (on the lower side in the figure), while the alloy composition is 48 wt % nickel in the portion of the film adjacent to magnetic gap film 11.

The recording inductive magnetic film 12 is similar. The alloy composition in the portion of the film adjacent to the protective layer 18 (on the upper side in the figure) is 83 wt % nickel, while the alloy composition in the portion of the film adjacent to the magnetic gap film 11 is 75 wt % nickel. Even more preferably, the alloy composition in the portion of the film adjacent to the protective layer 18 (on the upper side in the figure) is 83 wt % nickel, while the alloy composition in the portion of the film adjacent to the magnetic gap film 11 is 48 wt % nickel.

In the present working configuration, the change in the nickel content in the direction of thickness is continuous, with the nickel content continuously decreasing toward the magnetic gap film 11 in both magnetic films.

Accordingly, in the composite type thin-film magnetic head 1 of the present working configuration, neither the upper shielding magnetic film 10 nor the recording inductive magnetic film 12 has a uniform saturation flux density ($B_s$). More specifically, in the upper shielding magnetic film 10, the saturation flux density ($B_s$) increases with increasing proximity to the magnetic gap film 11, and conversely decreases with increasing proximity to the magneto-resistive element 5. In the recording inductive magnetic film 12, the saturation flux density ($B_s$) increases with increasing proximity to the magnetic gap film 11, and decreases with increasing proximity to the protective layer 18.

Figure 6:
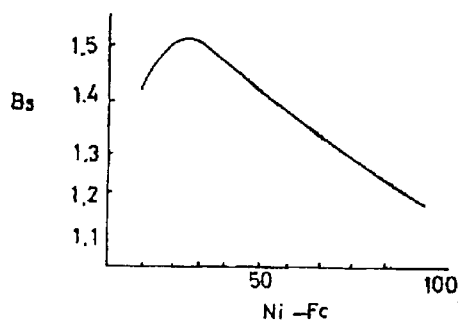
FIG. 6 is a graph which illustrates the relationship between the nickel content of the permalloy and the saturation flux density ($B_s$).

Specifically, in a nickel-iron binary alloy, there is a strong correlation between the nickel content of the alloy and the saturation flux density ($B_s$). As is shown in FIG. 6, the saturation flux density ($B_s$) decreases with an increase in the nickel content in the composition range where the nickel content is approximately 40 wt % or greater. In the present working configuration, as was described above, the nickel content gradually decreases toward the magnetic gap film 11. Accordingly, the saturation flux density ($B_s$) increases with increasing proximity to the magnetic gap film 11.

Figure 7:
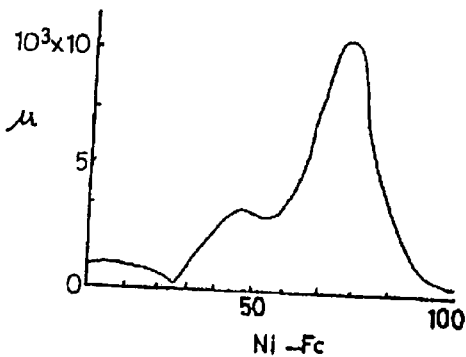
FIG. 7 is a graph which illustrates the relationship between the nickel content of the permalloy and the magnetic permeability ($\mu$).
Figure 8:
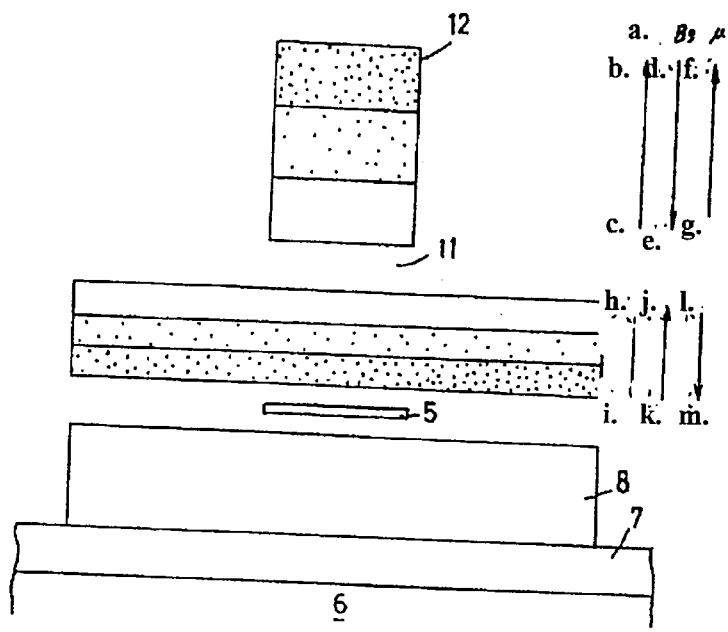
FIG. 8 is an explanatory diagram which shows the respective distributions of the nickel concentration, saturation flux density ($B_s$) and magnetic permeability ($\mu$) in the composite type thin-film magnetic head 1 of a modified working configuration.

Furthermore, a relationship such as that shown in FIG. 7 exists between the nickel content and the magnetic permeability ($\mu$). Accordingly, in the present working configuration, the magnetic films 10 and 12 show a decrease in magnetic permeability ($\mu$) with increasing proximity to the magnetic gap film 11. To describe this according to the layer composition, the upper shielding magnetic film 10 shows a decrease in magnetic permeability ($\mu$) with increasing proximity to the magnetic gap film 11, and conversely shows an increase in magnetic permeability ($\mu$) with increasing proximity to the magneto-resistive element 5. In the recording inductive magnetic film 12, the magnetic permeability ($\mu$) decreases with increasing proximity to the magnetic gap film 11, and increases with increasing proximity to the protective layer 18.

Accordingly, since the composite type thin-film magnetic head 1 of the present working configuration has a high saturation flux density ($B_s$) in areas close to the gap, a strong magnetic flux is generated in the magnetic gap, so that signals can be accurately recorded on the magnetic medium 22. Furthermore, in the composite type thin-film magnetic head 1 of the present working configuration, the saturation flux density ($B_s$) in areas close to the magneto-resistive element 5 is low, and the magnetic permeability ($\mu$) in such areas is high. Accordingly, there is a high shielding effect with respect to the magneto-resistive element 5.

In the above working configuration, a nickel-iron binary alloy (permalloy) was taken as an example, and a configuration in which the composition of this alloy was varied continuously was described. Such a continuous variation of the permalloy composition as described in this working configuration is ideal. However, to some extent, variation in discrete steps is also permissible. However, in the case of an extreme step-form variation in the composition of permalloy, the interface areas may act as quasi-gaps. Accordingly, a smooth variation in the composition is desirable.

Furthermore, although a nickel-iron binary alloy (permalloy) was cited as an example in the above working configuration, it would also be possible to use other alloys in the present invention.

Examples of alloys which can be used in the present invention include Mn-Zn ferrites, FeAlSi, FeGaSiRu, CoFeSiB, CoNbZr, CoNbZr/CoNbZrN, FeTaN and FeTaC, etc.

Furthermore, in the working configuration described above, the types of metals constituting the alloy were fixed, and the saturation flux density ($B_s$) was varied by varying the contents of said metals. However, it would also be possible to achieve the same object by laminating metals of different types.

Figure 9:
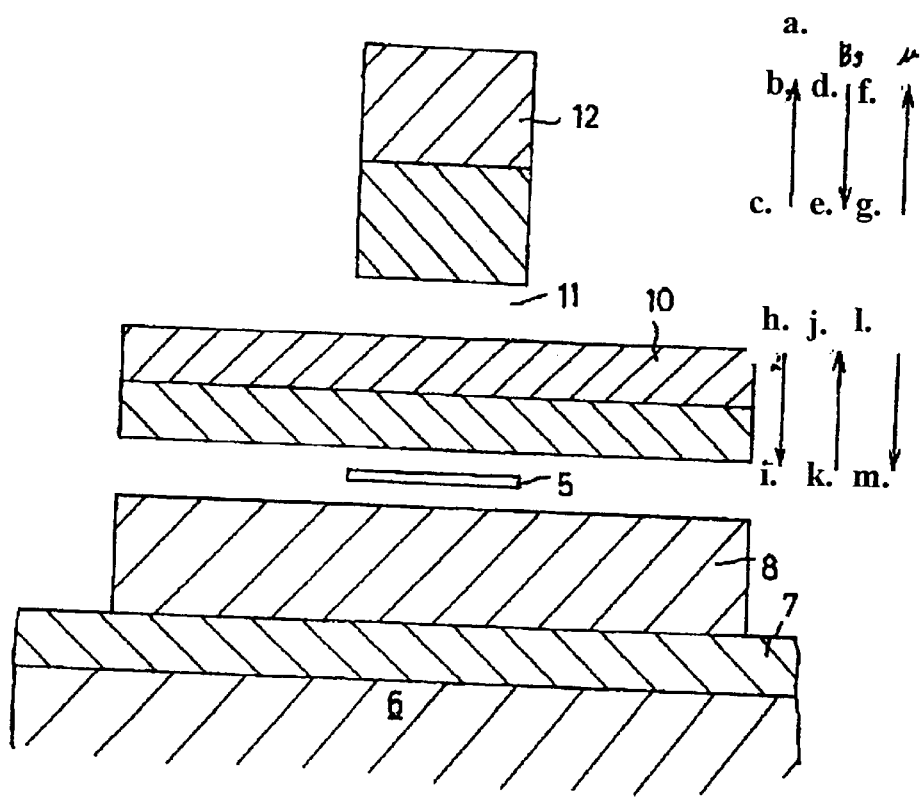
FIG. 9 is an explanatory diagram which shows the respective distributions of the metal composition, saturation flux density ($B_s$) and magnetic permeability ($\mu$) in the composite type thin-film magnetic head 1 of a modified working configuration.

FIG. 9 shows an example in which the upper shielding magnetic film 10 and the recording inductive magnetic film 12 are formed by laminating metals of different types.

In this working configuration, CoZrTa is laminated on the side close to the gap in both of the magnetic films 10 and 12, and permalloy is laminated on the other side. Furthermore, it would also be possible to use CoZrNi instead of CoZrTa.

In the composite type thin-film magnetic head 1 of the present working configuration as well, the saturation flux density ($B_s$) in areas close to the gap is high. Accordingly, the magnetic flux generated in the magnetic gap is strong, so that signals can be accurately recorded on the magnetic medium 22. Furthermore, in the composite type thin-film magnetic head 1 of the present working configuration, the saturation flux density ($B_s$) in areas close to the magneto-resistive element 5 is low, and the magnetic permeability ($\mu$) in such areas is high. Accordingly, the shielding effect with respect to the magneto-resistive element 5 is high.

Figure 10:
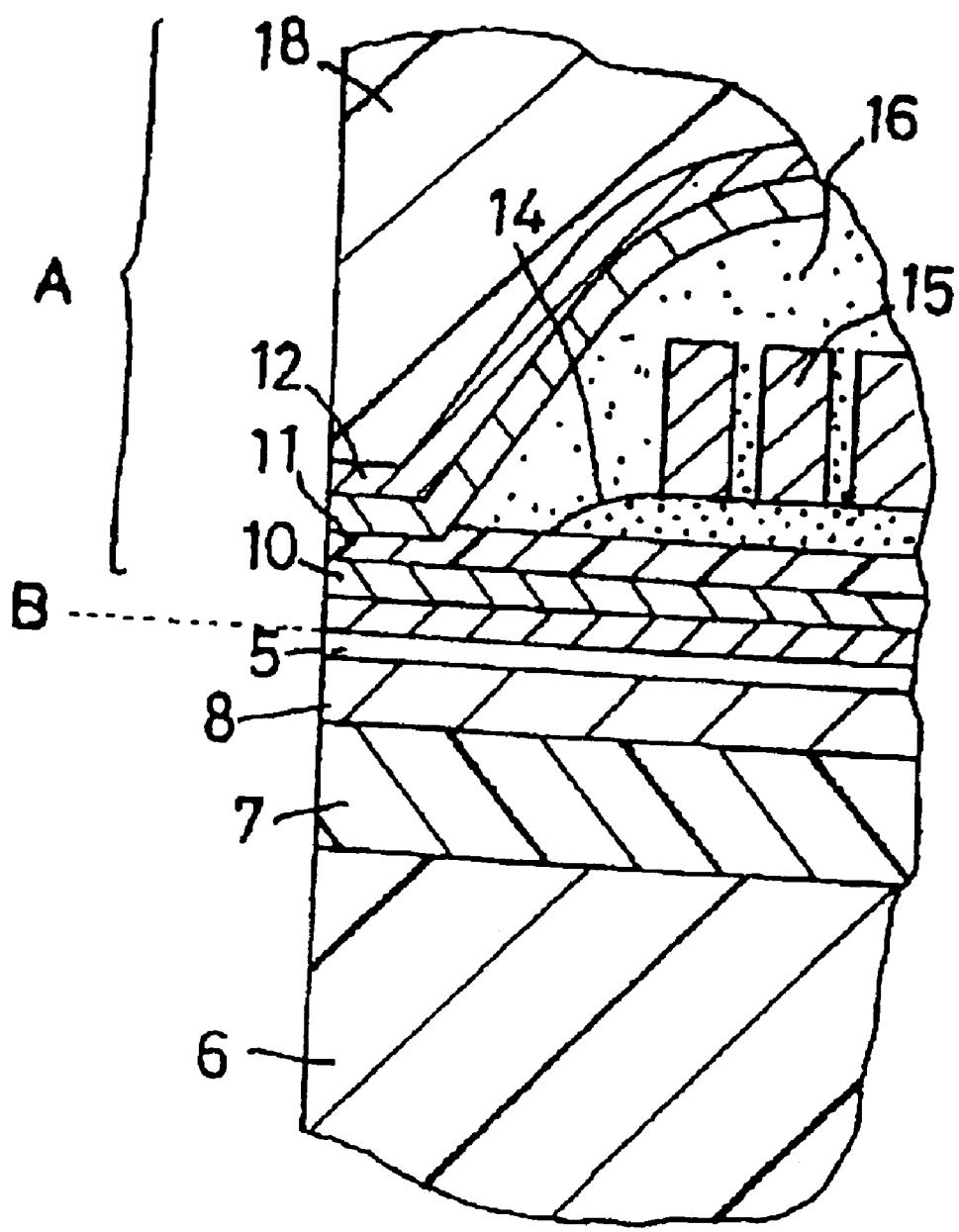
FIG. 10 is a sectional view of a composite type thin-film magnetic head in a modified working configuration using magnetic films formed by laminating different types of metals.

However, in a configuration in which the magnetic films are formed by laminating alloys of different types, as in the present working configuration, the interfaces between the different types of alloys may function as quasi-gaps as shown in FIG. 10. As a result, there is some concern that a second peak may be generated. Accordingly, caution is required.

Furthermore, in a configuration in which the magnetic films are formed by laminating alloys of different types, there is some concern that local batteries will be formed at the interfaces, so that micro-corrosion occurs. Accordingly, caution is required.

In the working configurations described above, both the upper shielding magnetic film 10 and the recording inductive magnetic film 12 consisted of films in which the saturation flux density ($B_s$) varied. However, it would also be possible to form only the upper shielding magnetic film 10 with a varying saturation flux density ($B_s$).

Next, the method used to manufacture the composite type thin-film magnetic head 1 of the present working configuration will be described.

First, the manufacturing process of the composite thin-film magnetic head 1 in general may be described as follows:

Specifically, a prescribed pre-treatment is performed on a substrate 6 consisting of a ceramic such as $Al_2O_3$-TiC, etc., after which an insulating layer 7 consisting of $Al_2O_3$ is formed by sputtering. Next, a lower shielding magnetic film 8 consisting of permalloy is formed by electroplating. The electroplating of the lower shielding magnetic film 8 is the same as that in a conventional method. Next, a magneto-resistive element 5 is formed by sputtering.

Then, an upper shielding magnetic film 10 is formed by electroplating. Here, the electroplating that is used to form the upper shielding magnetic film 10 is electroplating that is peculiar to the present invention. This electroplating method, including the universally known portions of said method, may be described as follows:

Specifically, a plating undercoating film (not shown in the figures) is formed on the surface of the layer constituting the magneto-resistive element 5, and this plating undercoating film is coated with a photo-resist by means of spin coating, etc. Then, exposure is performed with a photo-mask placed on the photo-resist film, and the exposed film is developed, so that a resist frame with a prescribed shape is formed on the surface of the layer constituting the magneto-resistive element 5.

Next, this substrate 6 is immersed in a barrel plating tank, and electroplating is performed.

This electroplating is used in order to deposit permalloy, and contains $Fe^{2+}$ ions and $Ni^{2+}$ ions.

Here, examples of compounds which can be used as the supply source of the $Fe^{2+}$ ions include ferrous sulfate ($FeSO_4 \cdot 7H_2O$), ferrous chloride ($FeCl_2 \cdot 4H_2O$), ferrous nitrate ($Fe(NO_3)_2$), ferrous borofluoride ($Fe(BF_4)_2$) and ferrous sulfamate ($Fe(SO_3 \cdot NH_2)_2$), etc. These compounds may be used singly, or may be selectively mixed.

In the present working configuration, it is desirable to use ferrous sulfate ($FeSO_4 \cdot 7H_2O$) or ferrous chloride ($FeCl_2 \cdot 4H_2O$) as the supply source of $Fe^{2+}$ ions, since such compounds increase the density of the thin film. The most suitable supply source of $Fe^{2+}$ ions is ferrous sulfate ($FeSO_4 \cdot 7H_2O$), which is commonly used in magnetic plating.

Furthermore, examples of compounds which can be used as the supply source of $Ni^{2+}$ ions include nickel sulfate (NiSO$_4$.6H$_2$O), nickel chloride (NiCl$_2$.6H$_2$O), nickel formate (Ni(COOH)$_2$), nickel sulfamate (Ni(NH$_2$SO$_3$)$_2$), nickel borofluoride (Ni(BF$_4$)$_2$) and nickel bromide (NiBr$_2$), etc. These compounds may be used singly, or may be selectively mixed.

Furthermore, in the present invention, nickel sulfate (NiSO$_4$.6H$_2$O) and nickel chloride (NiCl$_2$.6H$_2$O), which are commonly used in alloy plating, are most suitable as the supply source of the above-mentioned Ni$^{2+}$ ions.

Furthermore, in the present working configuration, the current density is caused to vary greatly with time in the electroplating process. Specifically, in the initial stages of plating, plating is performed at a low current density, and this current density is increased as time passes.

As a result, the nickel concentration in the film decreases as film formation proceeds.

Afterward, the resist frame and the excess plating undercoating film are removed by a universally known etching process. Next, an Al$_2$O$_3$ gap film 11 is deposited by universally known sputtering. Then, an insulating film 14 is formed by a universally known method.

Furthermore, a conductive coil film 15 is laminated on top of the above-mentioned films. A universally known electroplating technique is used for the formation of the conductive coil film 15.

Furthermore, a recording inductive magnetic film 12 is formed on top of the above-mentioned films. The means used to form the recording inductive magnetic film 12 is substantially the same as that used to form the aforementioned upper shielding magnetic film 10. However, whereas plating was initially performed at a low current density and then at an increasingly higher current density as time passed in the case of the upper shielding magnetic film 10, plating is conversely performed at a high initial current density and then at an increasingly lower current density as time passes in the case of this recording inductive magnetic film 12.

As a result, the nickel concentration in the film increases as film formation proceeds.

Furthermore, a protective layer consisting of Al$_2$O$_3$, etc., is formed on top of the recording inductive magnetic film 12 by a method such as sputtering, etc.

In the composite type thin-film magnetic head manufactured by the method of the present working configuration, the nickel concentration in areas closed to the gap is low, so that the saturation flux density (B$_s$) is high. Accordingly, the magnetic flux generated in the magnetic gap is strong, so that signals can be accurately written onto the magnetic medium 22. Furthermore, in areas close to the magneto-resistive element 5, the nickel concentration is high, so that the saturation flux density (B$_s$) is low. Furthermore, the magnetic permeability ($\mu$) is high. Accordingly, the shielding effect with respect to the magneto-resistive element 5 is high.

In the method described above, the composition of the deposited permalloy was varied by varying the current density during plating. However, it would also be possible to use a method in which the composition of the plating bath is varied over time, either in place of the above-mentioned method or in combination with the above-mentioned method.

Specifically, in such a method, the proportion of Ni$^{2+}$ ions is varied over time. For example, when the upper shielding magnetic film 10 is formed, the concentration of Ni$^{2+}$ ions is raised in the initial stages of plating, and this Ni$^{2+}$ concentration is lowered as time passes. Furthermore, when the recording inductive magnetic film 12 is formed, the concentration of Ni$^{2+}$ ions is lowered in the initial stages of plating, and this Ni$^{2+}$ concentration is raised as time passes.

Furthermore, as a modification of the above method, it would also be possible to prepare a plurality of plating tanks, to fill these plating tanks with plating solutions having different Ni$^{2+}$ ion concentrations, and to perform plating by immersing the substrate in the plating tanks in a prescribed order (multi-tank continuous film growth method).

If the above-mentioned method in which the current density is varied is compared with the method in which the concentration of the plating bath is varied, the method in which the current density is varied is superior in terms of the possibility of varying the nickel concentration along a smooth curve, while the method in which the concentration of the plating bath is varied is superior in terms of allowing a greater variation in the nickel concentration.

In cases where the above-mentioned method in which the current density is varied and the above-mentioned multi-tank continuous film growth method are used in combination, and the variation in current density and differences in the compositions of the respective plating baths are set so that uniform particle size growth is obtained, the upper shielding magnetic film 10 and recording inductive magnetic film 12 can be caused to vary in composition from 83 wt % nickel to 48 wt % nickel depending on the position in the film. Furthermore, this variation can be obtained as a continuous variation.

In the composite thin-film magnetic head of the present invention, the above-mentioned magnetic film adjacent to the magneto-resistive element has a higher saturation flux density (B$_s$) on the gap side than on the magneto-resistive element side. Accordingly, in the composite type thin-film magnetic head of the present invention, a strong magnetic flux is generated in the magnetic gap when a signal current is applied, so that the magnetic field strength during recording is high, and has a high gradient. Accordingly, the composite type thin-film magnetic head of the present invention is superior in terms of recording characteristics.

Furthermore, since the above-mentioned magnetic film used in the present invention has a low saturation flux density (B$_s$) on the magneto-resistive element side, this film also shows high performance as a magnetic shield. Accordingly, the magneto-resistive element is relatively unaffected by magnetism from the inductive head, so that the playback performance is also high.

What is claimed is:

1. A composite type thin-film magnetic head, comprising:
    an inductive head used for recording, the inductive head having two magnetic film layers facing each other across a magnetic gap; and
    a magneto-resistive head used for playback adjacent to the inductive head, the magneto-resistive head having a magneto-resistive element, wherein the inductive head and the magneto-resistive head are laminated, wherein a magnetic film layer adjacent to the magneto-resistive element has a saturation flux density on a gap side of the magnetic film layer decreasing continuously toward a magneto-resistive element side of the magnetic film layer, wherein the magnetic film layer adjacent to the magneto-resistive element comprises an alloy of nickel and iron, and wherein a nickel concentration of the magnetic film layer decreases smoothly from the magneto-resistive element side toward the gap side of the magnetic film layer.

2. A composite type thin-film magnetic head, comprising:
    an inductive head used for recording, the inductive head having two magnetic film layers facing each other across a magnetic gap; and
    a magneto-resistive head used for playback adjacent to the inductive head, the magneto-resistive head having a magneto-resistive element, wherein the inductive head and the magneto-resistive head are laminated, wherein a magnetic film layer adjacent to the magneto-resistive element has a higher saturation flux density on a gap side of the magnetic film layer than on a magneto-resistive element side of the magnetic film layer, the magnetic film layer adjacent to the magneto-resistive element formed by laminating two or more layers of different metal types.

* * * * *